(12) United States Patent
Sharma et al.

(10) Patent No.: US 12,082,080 B2
(45) Date of Patent: Sep. 3, 2024

(54) DYNAMIC SUBSCRIBER PROFILE MANAGEMENT

(71) Applicant: T-Mobile USA, Inc., Bellevue, WA (US)

(72) Inventors: Nandita Sharma, Issaquah, WA (US); Subramania Kaushik, Bellevue, WA (US)

(*) Notice: Subject to any disclaimer, the term of this patent is extended or adjusted under 35 U.S.C. 154(b) by 0 days.

(21) Appl. No.: 16/594,423

(22) Filed: Oct. 7, 2019

(65) Prior Publication Data
US 2021/0105591 A1   Apr. 8, 2021

(51) Int. Cl.
| H04W 8/04 | (2009.01) |
| H04M 15/00 | (2006.01) |
| H04W 4/029 | (2018.01) |
| H04W 4/24 | (2024.01) |
| H04W 8/18 | (2009.01) |

(52) U.S. Cl.
CPC ........... *H04W 4/24* (2013.01); *H04M 15/887* (2013.01); *H04W 4/029* (2018.02); *H04W 8/04* (2013.01); *H04W 8/18* (2013.01)

(58) Field of Classification Search
CPC ........... H04W 8/18; H04W 8/04; H04W 4/24; H04W 4/029
See application file for complete search history.

(56) References Cited

U.S. PATENT DOCUMENTS

| 10,142,829 | B2* | 11/2018 | Jin | H04W 4/60 |
| 2014/0099928 | A1* | 4/2014 | Caldwell | H04W 48/02 |
| | | | | 455/411 |
| 2015/0189542 | A1* | 7/2015 | Cazanas | H04L 12/189 |
| | | | | 370/312 |
| 2016/0048549 | A1* | 2/2016 | Patterson | G06Q 30/08 |
| | | | | 707/609 |
| 2017/0011382 | A1* | 1/2017 | Zoldi | H04W 8/24 |
| 2017/0134444 | A1* | 5/2017 | Buckley | H04M 15/57 |
| 2017/0195396 | A1* | 7/2017 | Beattie, Jr. | H04L 65/1016 |
| 2018/0184412 | A1* | 6/2018 | Youtz | H04W 72/048 |
| 2019/0098485 | A1* | 3/2019 | Kenyon | H04W 8/04 |

* cited by examiner

*Primary Examiner* — Jinsong Hu
*Assistant Examiner* — Farideh Madani
(74) *Attorney, Agent, or Firm* — Lee & Hayes, P.C.

(57) ABSTRACT

A dynamic subscriber profile management system allows subscriber device profiles to be selected and applied based on the subscriber profile based on device type, a location of the device, or a combination of both. The system may receive information relating to the subscriber, the type of device, and the location of the device to perform a lookup of available profiles or profile settings and either update an existing profile for current use or select a profile from a catalog of available profiles.

20 Claims, 6 Drawing Sheets

DYNAMIC SUBSCRIBER PROFILE MANAGEMENT

BACKGROUND

The background description provided herein is for the purpose of generally presenting the context of the disclosure. The work of the presently named inventor, to the extent it is described in this background section, as well as aspects of the description that may not otherwise qualify as prior art at the time of filing, are neither expressly nor impliedly admitted as prior art against the present disclosure.

Subscribers to a cellular or mobile data service are entitled to certain features and capabilities of their service based on contractual terms of their subscriber agreement. These service capabilities are managed via a subscriber profile stored in the home subscriber server and/or the subscriber profile repository. The former may store a master copy of the subscriber profile which contains information about the services that are applicable to the user including network access information. The latter may store business rules.

SUMMARY

In an embodiment, a subscriber profile may define such attributes as access control, the subscriber's allowed services, quality of service information, media priority service, spending limits, application service providers and corresponding sponsor identities. However, newer over-the-air technologies, such as small cells as found in 5G systems, offer a different capabilities in terms of bandwidth and stability. Unlike former times, when a subscriber had a single cell phone (or SIM card), a subscriber may now have a smart phone, a tablet, a smart watch, and a health monitor as well as numerous IoT devices including thermostats, kitchen appliances, and one or more automobiles. A single subscriber profile may not be desirable or appropriate for every situation, location, or device.

A dynamic subscriber profile service (DSS) may be coupled to a subscriber's home subscription server (HSS). The dynamic subscriber profile service may monitor a user's location, device, or both. The DSS may change a subscriber's service offerings via different profiles to optimize the user experience and/or cost based on the selected profile.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Subscriber profiles are used to control the features and functions available to a subscriber during use of a connected subscriber device. The subscriber profile may include information services available to a subscriber, such as data access or SMS messaging. Although both of these services are common today, there may still be limits on data use or in some cases SMS message limits. Other subscriber profile data may address quality of service information to match a subscriber's requested level of service regarding delivery guarantees and data rates. Other subscriber profile information may specify an entity to be billed for service and purchase charges as well as spending limits for some subscribers.

Prior art systems, such as those generally in accordance with the 3GPP standards for the most common wide area wireless networks, may associate one profile with one subscriber account where the profile is set contractually as part of the subscribers service agreement. That contract and its terms are fixed and independent of the subscriber's current situation such as what device is being used or the location of the current device. While some devices may be capable of more functions, the subscriber profile may apply across all devices used by a particular subscriber. For example, a subscriber may use a smartphone for data access, SMS messages, and voice communication. The same subscriber may use a tablet only for data access. The subscriber profile may control access rate, data limits, and quality of service (QoS) for access by both devices. Similarly, the subscriber may use devices in a variety of locations but whether the device is in the user's home, at work, or at a public venue, the contractual terms of the single profile may apply equally.

In an embodiment in accordance with the current disclosure, a cellular services system may provide different subscriber profiles for a subscriber based on the device type, the location of the device, or a combination of both. That way, data limits for a tablet used at home may not be billed at as high a rate as a smartphone used in a downtown business district while QoS and data rate guarantees may be higher for the smartphone. Similarly, location alone or device type alone may be the basis for the selection and application of different subscriber profiles. For example, a smartphone in a business location may get higher data rates than the same smartphone at a concert venue where the latter receives a discounted rate. A tablet being used at home may be billed to the subscriber while same the tablet used at work may be billed to a sponsor, such as the subscriber's employer.

Figure 1:
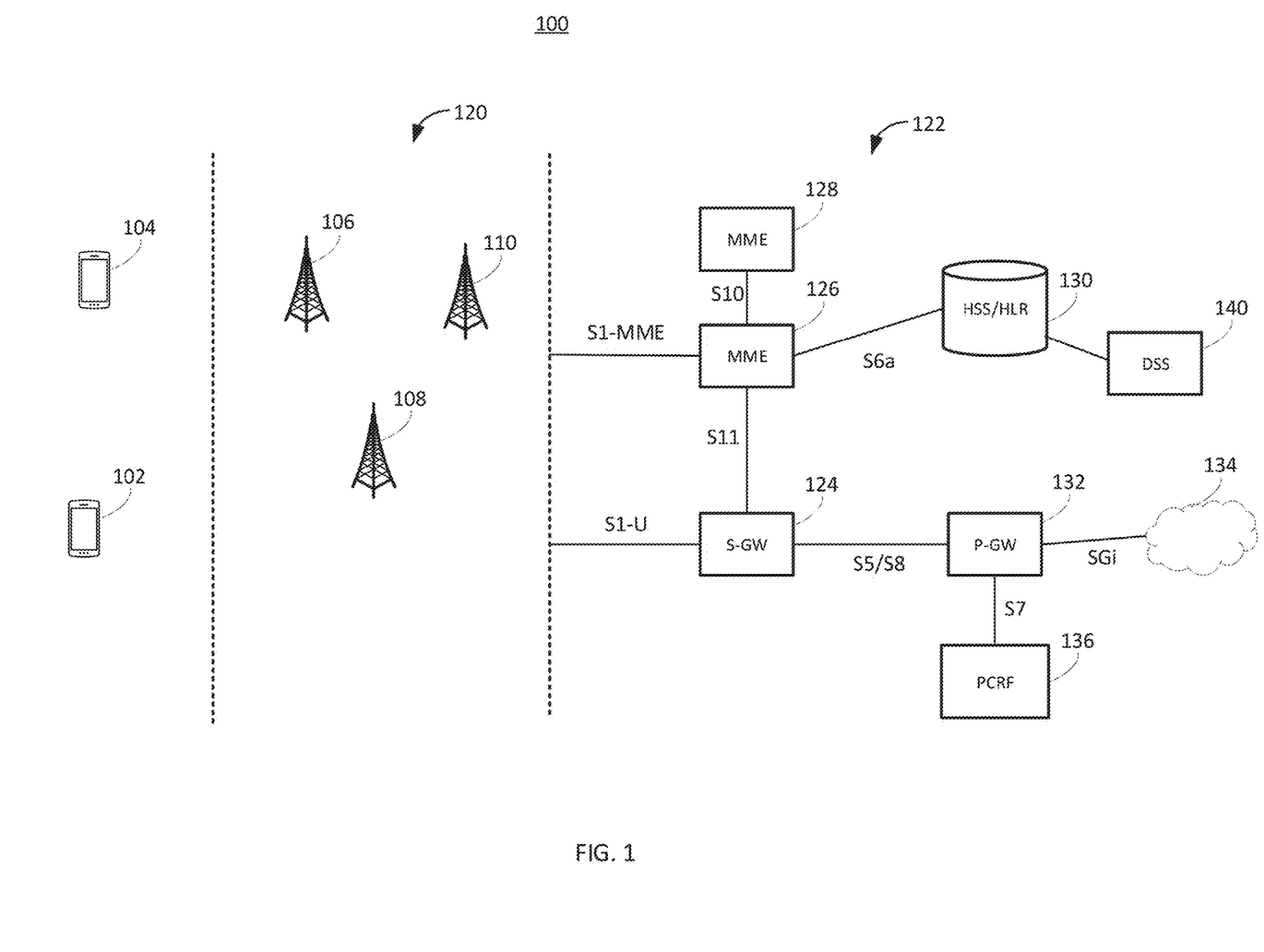
Turning to FIG. 1, a block diagram illustrates an exemplary embodiment of a system 100 in accordance with the current disclosure.

Turning to FIG. 1, a block diagram illustrates an exemplary embodiment of a system 100 in accordance with the current disclosure. The system 100 may include a plurality of subscriber devices 102, 104 in communication with a radio access network (RAN) 120 including cell sites 106, 108, 110 and other infrastructure equipment not depicted in FIG. 1.

Managing communication between subscriber devices and between a subscriber device and an external data network (the outside world) 134, is a core network 122, called in a 4G LTE example, the evolved packet core (EPC). The core network 122 illustrated here is greatly simplified for the sake of clarity. A serving gateway 124 may act as a router between cell sites 106, 108, 110 and the rest of traffic-oriented components. Mobility management entities (MMEs) 126, 128 manage signaling to the base stations including call set up and handoffs. A home subscriber server (HSS) 130 may be a central database that contains information about all the subscribers to the operator's communication system 100. In older communication system configurations the role of the HSS was performed by a home location registry (HLR). The HSS 130 may provide other system components with subscriber operational information. The functions and data associated with a prior art HSS may be found in several standards documents such as 3GPP TS 22.041. A dynamic subscriber profile service (DSS) 140 manages subscriber profiles and is discussed in more detail below with respect to FIG. 5. In some embodiments, the DSS 140 may be embodied within the HSS 130. In other embodiments, an equipment identity register (EIR) may be incorporated in the DSS 140 for device whitelisting and blacklisting among other functions. A packet data gateway (P-GW) 132 may handle communication between subscriber devices 102, 104 and the outside world 134.

A policy server 136, known in the 4G example as a policy control and charging rules function (PCRF) is responsible for control decision-making and flow-based charging. In an embodiment, the policy server 136 instructs the P-GW 132 to enforce the PCRF's decisions via a policy control enforcement function (not depicted) which resides in the P-GW 132.

Figure 2:
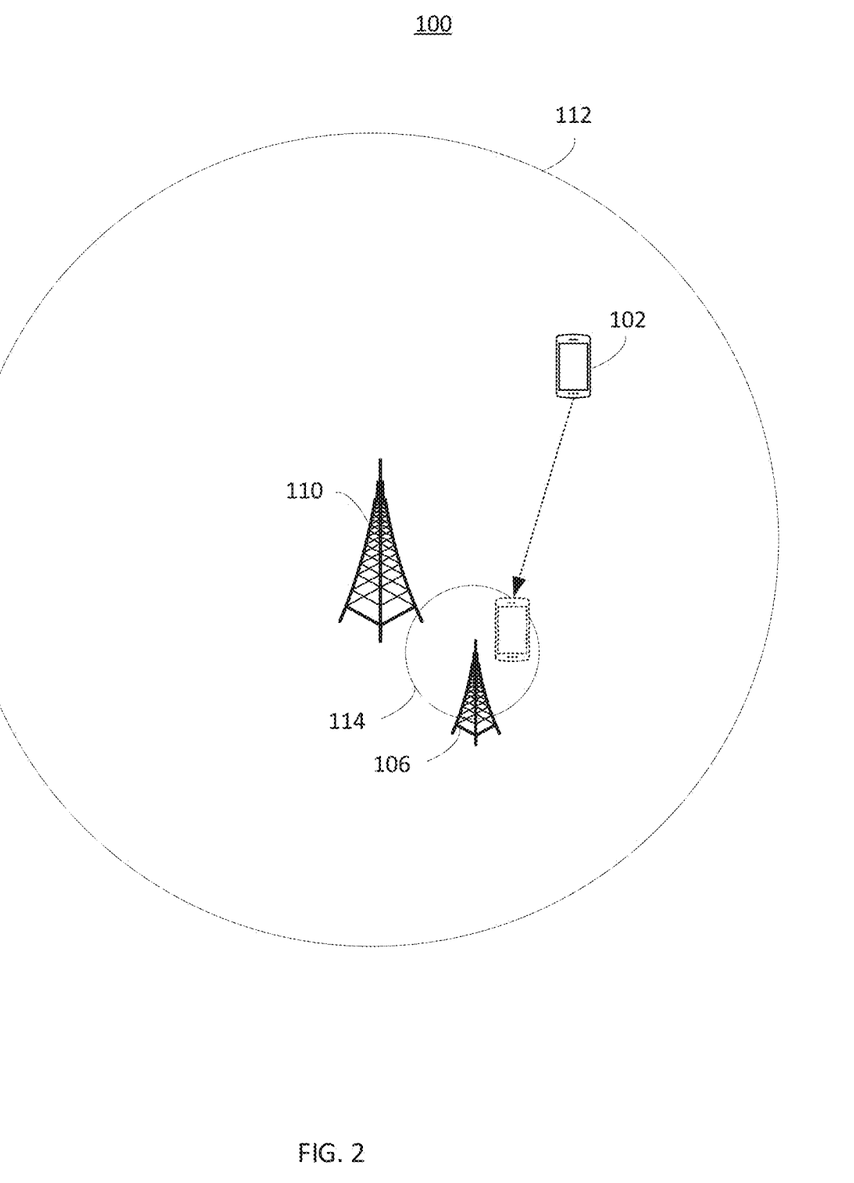
FIG. 2 depicts a use case for the system of claim 1.

FIG. 2 is an illustration of an embodiment supported by the DSS 140. A cell site 110 may provide a coverage area 112. A subscriber device 102 may move from the coverage area 112 to another coverage area 114 supported by cell site 106. In an embodiment, the cell site 106 may be a 5G small cell. In such an embodiment, the location of the device 102 be used to select a different subscriber profile for subscriber device settings.

Figure 3:
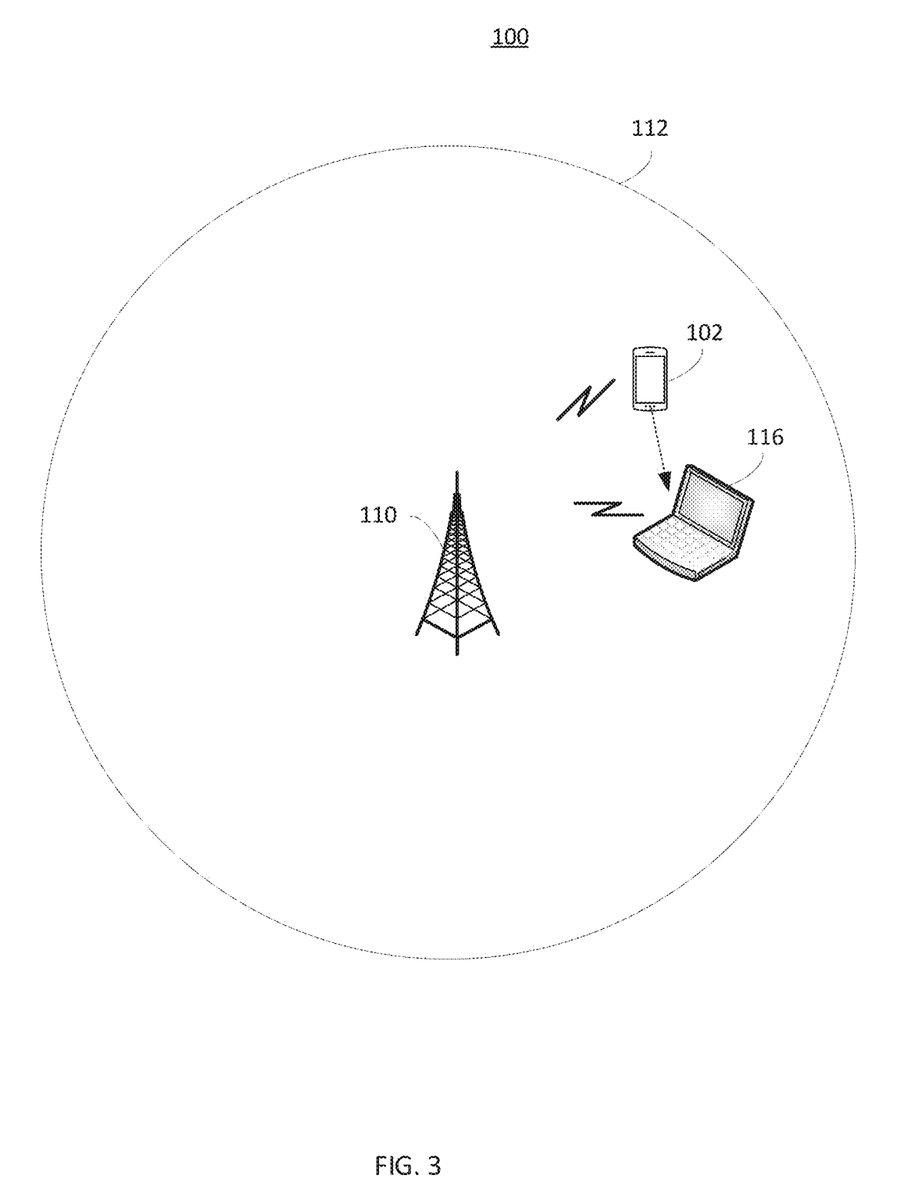
FIG. 3 depicts another use case for the system of claim 1.

FIG. 3 is an illustration of another embodiment supported by the DSS 140. In this example, a subscriber may switch from a first device 102, a smartphone, to a second device 116, a laptop. Even though the location may remain the same in terms of cell site coverage or even physical location, a different subscriber profile may be selected for use in the session with the second device 116 compared to the subscriber profile used for the first device 102.

Figure 4:
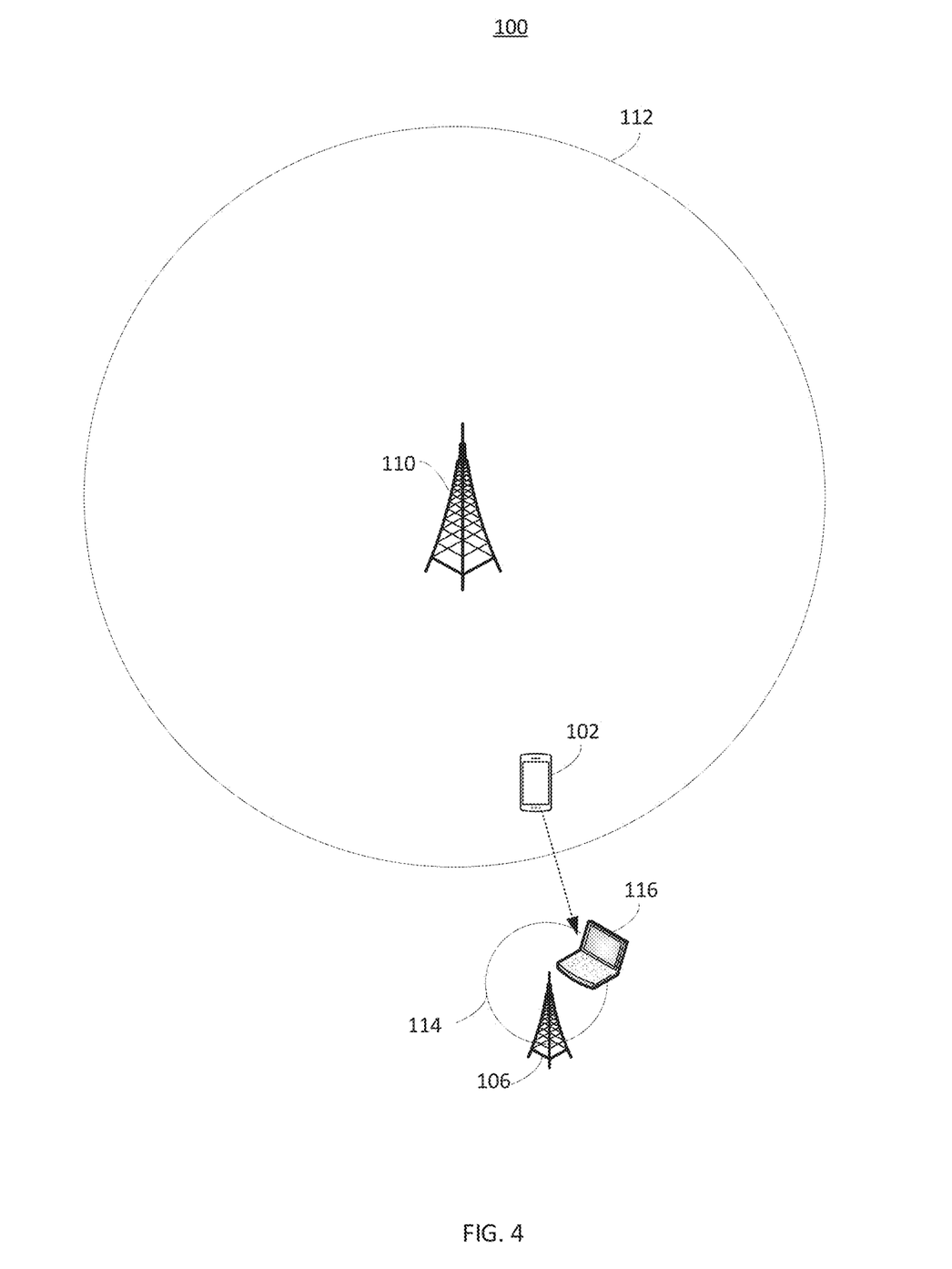
FIG. 4 depicts yet another use case for the system of claim 1.

FIG. 4 is an illustration of yet another exemplary embodiment supported by the DSS 140. In this embodiment, a subscriber using the first device 102 may move from one location to another while changing from the first device 102 to the second device 116. Again, separate subscriber profiles may be selected from a plurality of subscriber profiles based on the combination of location and device type.

Figure 5:
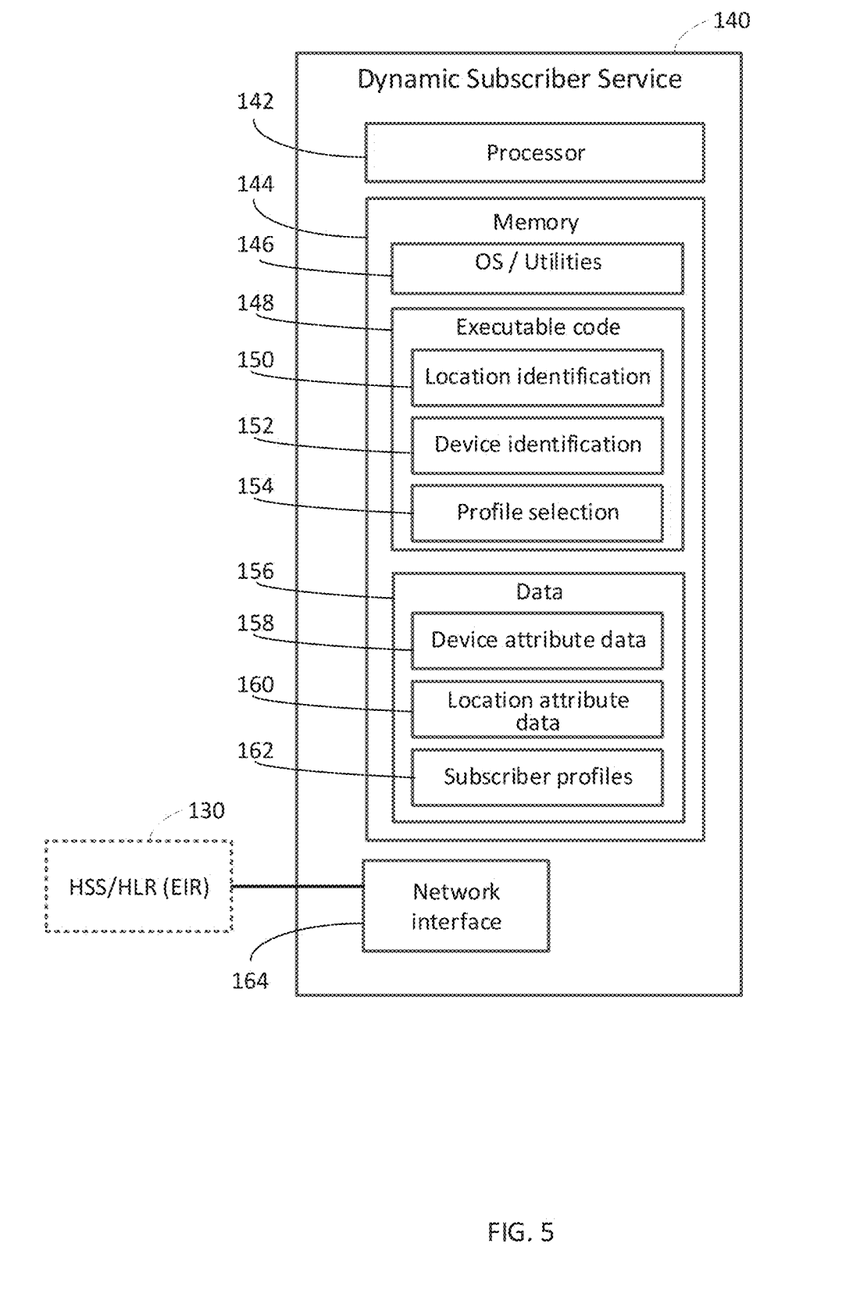
FIG. 5 is a block diagram of an exemplary dynamic subscriber profile service in accordance with the current disclosure.

A dynamic subscriber profile service (DSS) 140 is shown in exemplary and illustrative form in FIG. 5. The DSS 140 may include a processor 142 coupled to a memory 144 and a network interface 164. The memory 144 may include an operating system and utilities 146 that support operation of the DSS 140 for communication, file management, security, user interface (when available), system configuration, etc. The memory 144 may include executable code 148 or modules that support the unique role of the DSS 140 in the communication system 100. The executable modules are a location identification module 150, a device identification module 152, and a profile selection module 154, among others not depicted.

The memory 144 may also include data store 156. The data store 156 may include device attribute data 158, location attribute data 160, and, in an embodiment, subscriber profiles 162. In an embodiment the subscriber profiles 162 may include profiles for multiple subscribers as well as multiple profiles for individual subscribers. The network interface 164 may couple the DSS 140 to the HSS 130.

In general, the HSS 130 receives information related to a connection request from a mobile device 102d for packet-oriented services, internetworking wireless local area network (WLAN), or IMS multimedia telephone service. The HSS may resolve device identification information to a particular subscriber. In a prior art embodiment, an HSS would confirm or block the request based on the subscriber profile. The HSS 130 in accordance with the current disclosure may collect information about the subscriber and the requesting device, such as a device identifier as well as device location information that may include cell site data, WiFi access point information, GPS, triangulation, or other location information. The device identifier may be or include an international mobile station equipment identifier (IMEI), an international mobile station equipment identifier software version (IMEISV), or a type allocation code (TAC). The TAC may include a device serial number. The IMEISV may include the unique IMEI for the device as well as a software version of the phone operating system for use in making compatibility choices.

The subscriber, device identifier, and location information may be passed to the DSS 140. The HSS 130 may pass such information to the DSS 140 for a plurality of subscribers and subscriber devices as requests for service are received.

Once the information is received at the DSS 140, the device identification module 152 may be used to determine characteristics of the device that may be used to identify possible subscriber profiles or profile traits. In some cases, selection of one of several subscriber profiles or profile features may be made based on a specific device, such as make/model, or may be made based on characteristics such as a communication type (4G, 5G, WiFi, etc.) or screen size, to name a few. Similarly, the location information may be resolved into any of several forms, such as geographic coordinates, political entity such as city/state/country, a facility or venue such as a theater, or a destination such as an amusement park or nature preserve.

The profile selection module 154 may then use selection criteria or a rules engine to select or build a profile that meets a criteria for that user/subscriber. In an embodiment, the profile selection module 154 may access device attribute data 158 and location attribute data 160. These respective attribute data 158, 160 may hold information corresponding to subscriber features or services for the respective device type and location. In an embodiment, rules may be used to prioritize device and/or location features for selection of a subscriber profile from the available subscriber profiles.

In an embodiment, each subscriber may have a plurality of individual profiles from which a selection is made. In another embodiment, generic profiles based on device type and/or location may be selected. In yet another embodiment, the profile selection module 154 may customize the subscriber profile based on applicable characteristics of the device type, the location, or both. For example, a smartphone of a subscriber may be authorized for international calls when located at the subscriber's place of business, while the same smartphone may be restricted to domestic calls when at the subscriber's home. In another example, a subscriber's cell phone may operate with unlimited data rates while a data rate of the subscriber's tablet may be capped at a reduced speed.

The selected or updated subscriber profile may be returned to the HSS 130 after the profile selection module 154 has generated or selected the appropriate subscriber profile.

Figure 6:
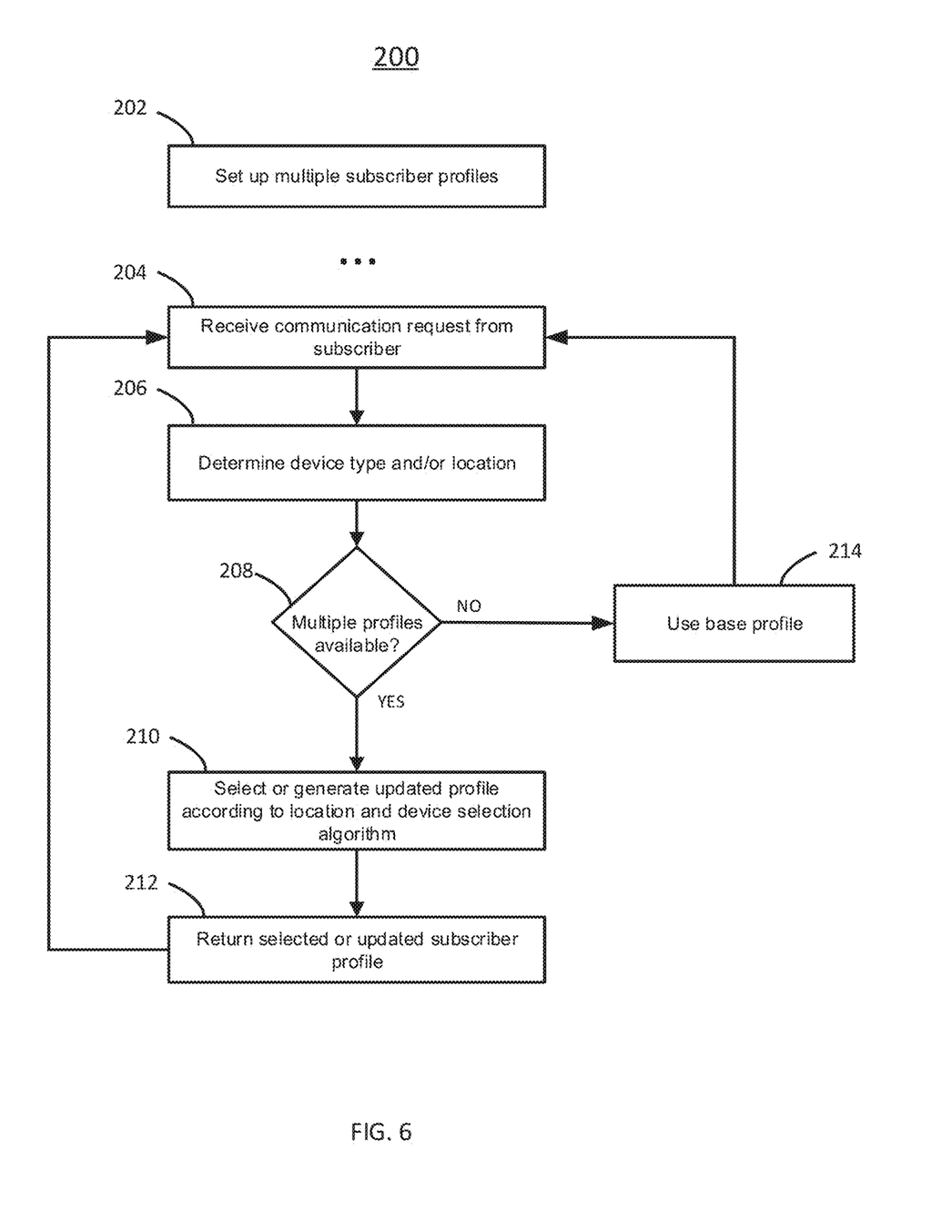
FIG. 6 is a flowchart of a method of operating the dynamic subscriber profile service.

FIG. 6 is a flowchart of a method 200 of operating a dynamic subscriber profile service (DSS) 140. At block 202, multiple subscriber profiles may set up, for example in accordance with a subscriber contract, and may specify certain device attributes, certain location attributes, or a combination of both. In an embodiment, specific profiles may generated and selected as described above. In another embodiment, only profile elements linked to specific locations and/or devices may be specified for use in building a specific subscriber profile at the time a particular device requests service.

At block 204, a request may be received at the DSS 140 from the HSS 130 for a subscriber profile related to a subscriber accessing the communication network. The request may include an identity of the subscriber, a device identifier of a device 102 associated with the request, such as an IMEISV, and location information for the device 102.

The DSS 140 may determine, at block 206, the device type using the device identifier. In an embodiment, the device 102 may be one of a plurality of devices associated with a particular subscriber. Similarly, the DSS 140 may perform any necessary location resolution, for example, from latitude/longitude to a street address or location name.

At block 208, a determination may be made if selectable profiles are enabled for the subscriber, and if so, whether multiple profiles are available or may be constructed. If not, execution may pass to block 214 and a default profile may be returned to the HSS.

If so, execution may pass from block 208 to block 210 where the profile selection module 154 may use the device type and location information, singly or in combination, to select or generate a subscriber profile. Once the selected or updated subscriber profile is ready, execution may continue at block 212 where the profile is returned to the HSS 130 for use in completing the requested communication service to the subscriber device.

In various embodiments, the subscriber profile may be updated with one or more service features for the device such as allowed services like international dialing or call forwarding. Other service features may include a quality of service setting or charging-related information such as billing different devices to different accounts. In another embodiment, the service feature may be a priority level for a multimedia priority service (MPS). In some embodiments, the service feature may be a spending limit profile. For example, a spending limit related to premium content may be higher for some devices compared to other of the subscriber's devices.

A technical effect of the disclosed system and method is the ability to change communication system profiles affecting services available to a subscriber on a device-by-device basis. Device performance and capabilities are not limited to a single predetermined subscriber profile but rather are selected in real time based on the type of device, the location of the device, or both.

Both customers and system providers benefit from the disclosed system. System providers are able to limit or authorize features associated with individual devices or locations, potentially allowing better allocation of resources at crowded venues or maintaining a high QoS for devices not capable of utilizing that level of service. Customers may benefit from the ability to customize services on a device-by-device basis or location. For example, a customer may require a high QoS at work but could reduce the requirement and save money when the device is used away from work. Similarly, some devices may primarily be used by children and may not need high data rates or high QoS.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A dynamic subscriber profile service (DSS), comprising:
 a location identification module that receives location information corresponding to a plurality of devices, each of the plurality of devices having a set of device-specific features, wherein the plurality of devices belongs to a single user having a plurality of subscriber profiles;
 a database storing service features associated with location attributes; and
 a processor coupled to the location identification module and the database, the processor is configured to:
  identify a location of a device of the plurality of devices in real time;
  determine attribute data about the location;
  in response to determining the attribute data and identifying the location of the device in real time, dynamically build a new device profile for the device as a function of the attribute data, the location, and the device; and
  according to a dynamic schedule, execute:
   updating one of the plurality of subscriber profiles for the single user associated with the device in response to the selected device according to one or more service features associated with an attribute of the location; and
   adding the new device profile according to the one or more service features associated with the attribute of the location and the set of device-specific features, the one or more service features including at least one service feature from a list of service features comprising international dialing, call forwarding, a quality of service setting, charging-related information, a priority level for a multimedia priority service (MPS), and a spending limit profile.

2. The dynamic subscriber profile service of claim 1, further comprising:
 a device interface that receives attribute information about each of the plurality of devices; and
 a device attribute database, the device attribute database stores service features associated with the plurality of devices based on the attribute information associated with the device, wherein the processor is configured to receive an indication of which of the plurality of devices is in use by the single user and is configured to update the one of the plurality of subscriber profiles associated with the single user of the device according to one or more service features associated with the device.

3. The dynamic subscriber profile service of claim 1, further comprising accessing one or more rules to prioritize the attribute data and the device-specific features for updating the one of the plurality of subscriber profiles.

4. The dynamic subscriber profile service of claim 1, further comprising selecting a generic profile to be used for updating an additional subscriber profile of the plurality of subscriber profiles.

5. A method of operating a dynamic subscriber profile service (DSS), the method comprising:
receiving, at the DSS, a location of a subscriber device in real time, from one of a plurality of subscriber devices associated with a subscriber, each of the plurality of subscriber devices having a set of device-specific features, wherein the plurality of subscriber devices belong to a single user having multiple subscriber profiles;
receiving, at the DSS, a device identifier of the one of the plurality of subscriber devices;
determining, at the DSS, a device type of the subscriber device based on the device identifier;
determining, at the DSS, a service feature associated with a combination of the location of the subscriber device and the device type of the subscriber device; and
in response to determining the service feature and the location of the subscriber device, at the DSS:
dynamically constructing a new device profile for the subscriber device as a function of the service feature, the location, and the subscriber device;
according to a dynamic schedule, updating, via the DSS, one of the multiple subscriber profiles of the subscriber according to the device type and the service feature; and
adding the new device profile according to one or more service features associated with the device type, the service feature, and an attribute of the location, the one or more service features including at least one service feature from a list of service features comprising international dialing, call forwarding, a quality of service setting, charging-related information, a priority level for a multimedia priority service (MPS), and a spending limit profile.

6. The method of claim 5, further comprising:
determining, at the DSS, one or more service features associated with the device type; and
updating, via the DSS, one or more services of the multiple subscriber profiles based on the one or more service features associated with the subscriber device.

7. The method of claim 5, wherein the service feature is an allowed service.

8. The method of claim 5, wherein the service feature is a quality of service (QOS) level.

9. The method of claim 5, wherein the service feature is charging-related information.

10. The method of claim 5, wherein the service feature is the priority level for the multimedia priority service.

11. The method of claim 5, wherein the service feature is the spending limit profile.

12. The method of claim 5, wherein a home subscriber server (HSS) incorporates the DSS.

13. The method of claim 5, wherein the DSS comprises an equipment identity register (EIR).

14. The method of claim 5, wherein determining the device type comprises receiving from a network an international mobile station equipment identifier software version (IMEISV) of the subscriber device.

15. The method of claim 5, wherein determining the device type comprises receiving from a network a type allocation code (TAC) of the subscriber device.

16. A method of operating a dynamic subscriber profile service (DSS), the method comprising:
receiving, at the DSS, a device type, in real time, from at least one subscriber device of a plurality of subscriber devices associated with a subscriber, each of the plurality of subscriber devices having a set of device-specific features, wherein the plurality of subscriber devices belong to one user having multiple subscriber profiles;
selecting, by the DSS, one or more services associated with the device type of the at least one subscriber device; and
in response to the selecting, by the DSS:
dynamically building a new device profile for the at least one subscriber device as a function of the selecting and the receiving;
according to a dynamic schedule, updating, via the DSS, in response to the selecting, one or more services of the multiple subscriber profiles of the subscriber based on the one or more services associated with the device type;
adding the new device profile according to the set of device-specific features and the one or more services associated with the device type, the one or more services including at least one service feature from a list of service features comprising international dialing, call forwarding, a quality of service setting, charging-related information, a priority level for a multimedia priority service (MPS), and a spending limit profile; and
operating the plurality of subscriber devices according to an updated multiple subscriber profiles.

17. The method of claim 16, further comprising: receiving,
at the DSS, a location of the at least one subscriber device; and
updating, via the DSS, the one or more services of the multiple subscriber profiles of the subscriber based on the location of the plurality of subscriber devices.

18. The method of claim 16, wherein the one or more services is one of an allowed service or a quality of service of the allowed service.

19. The method of claim 16, wherein the one or more services is the multimedia priority service priority level.

20. The method of claim 16, wherein the one or more services is the spending limit profile.

* * * * *